United States Patent Office 3,259,641
Patented July 5, 1966

3,259,641
HALO-SUBSTITUTED ETHER PRODUCTION
Charles E. Castro, Riverside, Calif., assignor to Shell Oil Company, New York, N.Y., a corporation of Delaware
No Drawing. Filed June 28, 1961, Ser. No. 120,171
12 Claims. (Cl. 260—408)

This invention relates to the synthesis of ether-substituted alpha-halocarbonyl and/or nitrile compounds and particularly to the production of valuable alpha-halo-beta-ether-substituted aldehydes, ketones, carboxylic acids, esters, amides, and nitriles by a new and advantageous method. It also deals with novel products of this new synthesis.

No simple, commercially suitable, economical method has heretofore been available for the manufacture of carbonyl compounds which are substituted in the alpha position by halogen and contain an ether substituent on the adjacent carbon atom. This structural arrangement imparts especially desirable properties to the resulting carbonyl compounds making them valuable products not only for direct use for many purposes but also, as intermediates for the synthesis of other new compounds which are also useful products.

An important object of the invention is therefore to provide a new method whereby substituted carbonyl compounds of the foregoing types can be produced economically from available starting materials. Another object is the provision of new substituted aldehydes, ketones, carboxylic acids, esters, amides and nitriles having a unique structure which makes them especially desirable products of the invention. A special object is to provide an efficient method for manufacturing alpha-halo-beta-hydrocarbyloxy carbonyl compounds from the corresponding alpha,beta - ethylenic carbonyl compounds. Still another object is to provide new alpha,alpha-dihalo carbonyl compounds substituted by an ether group which is linked to the carbon atom attached to the dihalo carbon, which new compounds are useful biocides not hitherto obtainable. Further objects and advantages of the invention will be apparent from the following description in which some of the more advantageous modifications will be emphasized without intent at limitation on the new process and its products.

In accordance with the invention alpha-halo-beta-ether-substituted carbonyl or nitrile compounds are produced by reacting an alpha,beta-ethylenic carbonyl or nitrile compound with a cupric halide in the presence of an alcohol. The reaction as applied to the production of alpha - halo - beta - ether-substituted carbonyl compounds which represent an especially advantageous modification of the invention can be represented by the equation

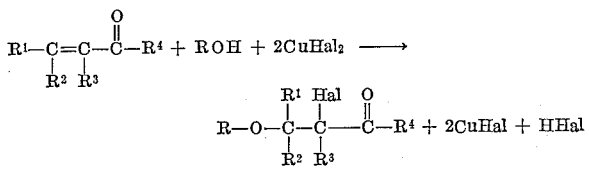

In this equation Hal represents a halogen atom, particularly, chlorine, or bromine; R represents the organic group of the starting alcohol, $R^1$, $R^2$ and $R^3$ represent hydrogen atoms or the same or different organic groups linked to the carbon atoms shown by bonds directly attached to carbon atoms, and $R^4$ represents a hydrogen atom, a hydroxyl or amino group or an organic radical which may be linked to the carbonyl carbon atom thru a carbon, oxygen, sulfur or nitrogen atom. $R^3$ can also represent a halogen atom which may be the same or different from that of the cupric halide used for the reaction. In such case the product will be an alpha,alpha-dihalo carbonyl compound which can also be produced by starting with an alpha,beta-ethylenic carbonyl compound in which $R^3$ is a hydrogen atom and reacting four moles of cupric halide per mole of the ethylenic carbonyl compound. The equation for this especially advantageous modification of the process of the invention is:

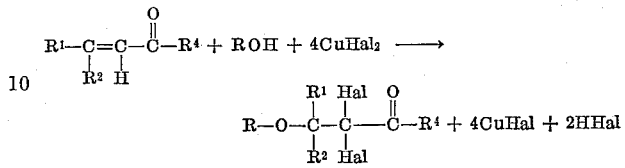

The reaction can be carried out by any suitable method of contacting the three essential reactants. As a general rule, operation with all the reactants in the liquid phase is most convenient. When the alcohol and/or ethylenic carbonyl compound is liquid under the reaction conditions one can usually carry out the reaction without any added solvent but with higher molecular alcohols and carbonyl compounds it may be advantageous to use a mutual solvent therefor in order to promote more intimate contact of the reactants. Inert solvents which can be used successfully include hydrocarbons such as pentane, hexane, benzene, and the like, halohydrocarbons such as dichloroethane, carbon tetrachloride, chloroform, etc., and similarly non-reactive compounds. Alternatively one can use dispersions or suspensions of reactants which do not dissolve to form a single liquid phase system.

The temperature of reaction is not critical although extremely high temperatures at which decomposition or other undesirable side reactions take place to an excessive extent are preferably avoided. Elevated temperatures have the advantage of promoting faster reaction so it is usually advantageous to use temperatures in the range of about 50° C. to about the boiling point of the reaction mixture under atmospheric pressure. By the use of superatmospheric pressure one can operate at higher temperatures but the increased cost is seldom warranted. Lower temperatures can also be used but are also usually less preferable because of the longer reaction time required.

It is not essential to employ the reactants in the stoichiometric proportions indicated by the foregoing equations since an excess of any one or two of the reactants with respect to the third can be employed successfully in the new process. An excess of alcohol, for example, may advantageously serve as a suitable solvent for the reaction. Where such an excess is used for reaction with an alpha,beta-ethylenic aldehyde or ketone the product may be an acetal or ketal but this is usually not disadvantageous since these products generally can be used in the same way as the alpha-halo-beta-ether aldehydes and ketones obtained by the new method.

Contact times for the reactants of the order of about 0.5 to about 12 hours are generally suitable, times within the range of about 2 to about 3 hours being more advantageous, the shorter times being used at the higher temperatures and vice versa. One can take advantage of the change in color which accompanies the reduction of cupric halides to the cuprous form in determining when the reaction has proceeded sufficiently toward completion.

The new process has special advantage for the production of alpha-halo-beta-ether-substituted aldehydes which are particularly useful intermediates for the manufacture of insecticides, fungicides, and the like. Among suitable starting aldehydes for use in this modification of the invention are, for example, aliphatic aldehydes such as acrolein, methacrolein, crotonaldehyde, alpha-ethylacrolein, alpha-isopropylacrolein, alpha-hexylacrolein, beta-methylcrotonaldehyde, beta-cyclohexylacrolein, betamethyl-beta-isopropylacrolein, alpha-methyl-beta,beta-diethylacrolein, geranial, alpha-isopropyl-crotonaldehyde, and beta-allylacrolein. Representative alpha,beta-ethylenic aromatic aldehydes which can be similarly reacted are, for instance, cinnamyl aldehyde, alpha-methyl cinnamyl aldehyde, gamma-benzyl crotonaldehyde, beta-(para-chlorophenyl)acrolein, metanitrocinnamyl aldehyde, ortho-hydroxycinnamyl aldehyde, para-methoxycinnamyl aldehyde, piperonyl acrolein and ortho-nitrocinnamylidene-acetaldehyde. Other alpha,beta-ethylenic cyclic aldehydes which can be converted successfully to alpha-halo-beta-ether-substituted aldehydes in the same way are, for example, Δ¹- or beta-cyclocitral, Δ¹-tetrahydrobenzaldehyde, 4-methyl-Δ¹tetrahydrobenzaldehyde and Δ¹,⁴-dihydrobenzaldehyde. Heterocyclic alpha,beta-ethylenic aldehydes which can be similarly reacted include 4,5-dihydrofurfural, alpha-methyl furfural, 5,6-dihydro-1,2-pyran-3-carboxaldehyde, dihydrothiophenealdehyde, 1-benzoyl-5-formyl-1,2,2a,3 - tetrahydrobenz(c,d)indole, and the like. When using alpha,beta-ethylenic aldehydes having more than one multiple linkage between carbon atoms in the molecule, as is the case with geranial and beta-allylacrolein mentioned above, it is a feature of the new process of the invention that the ethylenic linkage alpha,beta to the aldehyde group is selectively reacted while simultaneous addition of alcohol together with halogen at the ethylenic bond or bonds further removed from the carbonyl group does not take place simultaneously. In this way alpha-halo-beta-ether-substituted unsaturated aldehydes which are another group of valuable new compounds otherwise difficult to synthesize may be made although halogen addition at the isolated ethylenic bond may take place at the same time with this type of starting compound. Thus from reaction of geranial with ethanol and cupric chloride one may obtain 3,7-dimethyl-2,2-dichloro-3-ethoxy-6-octenal and 3,7-dimethyl-2,2,6,7-tetrachloro-3-ethoxyoctanal. In general, the most favorable yields and conversions have been obtained with alpha,beta-ethylenic aldehydes having 3 to 20 carbon atoms per molecule, especially good results being obtained with alpha,beta-ethylenic hydrocarbon aldehydes of 3 to 10 carbon atoms. The new process of this invention is of particular value in the reaction of alpha,beta-ethylenic aliphatic aldehydes of 3 to 8 carbon atoms per molecule with an alcohol and cupric halide.

Specific alpha,beta-ethylenic ketones which can be reacted with an alcohol and a cupric halide to produce alpha-halo-beta-ether-substituted ketones according to the invention are, for instance, aliphatic ketones such as methyl vinyl ketone, ethyl vinyl ketone, methyl isopropenyl ketone, mesityl oxide, hexene-3-one-2, decen-4-one-6 and the like; alpha,beta-ethylenic cyclic ketones such as cyclohexen-3-one, 4-methylcyclohexen-2-one, vinyl cyclohexyl ketone, vinyl cyclohexenyl ketone, Δ¹-methene-6-one, etc. Suitable starting ketones of these types are described, together with methods for their production, in U.S. Patent 2,246,032 for instance. Representative alpha,beta-ethylenic aromatic ketones which can be similarly reacted include vinyl phenyl ketone, benzalacetone, 2,4-dimethylseneciophenone, dibenzalacetone, etc.

Ketones having more than one ethylenic group in the molecule can also be used in the new process. Those having a plurality of ethylenic groups which are alpha, beta to the ketone carbonyl group or groups will yield polyhalo-polyether-substituted ketones, and when such products are desired one should react double the proportions of cupric halide and alcohol to ketone indicated in the foregoing equations. In this way reacting with methanol and eight mole proportions of cupric chloride with divinyl ketone gives 2,2,4,4-tetrachloro-1,5-dimethoxypentanone-3; diisopropenyl ketone with isopropanol and four mole proportions of cupric bromide gives 2,4-dimethyl-2,4-dibromo-1,5-diisopropoxypentanone-3; and phorone reacts with eight moles of cupric chloride and two moles of n-propanol to produce 3,3,5,5-tetrachloro-2,6-dimethyl-2,6-di-n-propoxyheptanone-4. When using alpha,beta-ethylenic ketones having a multiple linkage between carbon atoms further removed from the carbonyl carbon atom, the ethylenic linkage alpha,beta to the ketone carbonyl group can be selectively reacted giving unsaturated halo-ether-substituted ketones which are also valuable new products. Thus when reacting ethanol and four mole proportions of cupric chloride with vinyl allyl ketone and Δ⁸-heptadecenyl vinyl ketone one can obtain 2,2-dichloro-1-ethoxy-5-hexen-3-one and 1-ethoxy-2,2-dichloro-11-eicosen-3-one, respectively. However, halogen addition to the isolated double bond can also take place.

Among the alpha,beta-ethylenic carboxylic acids which can be reacted with cupric halide and an alcohol to make alpha-halo-beta-ether-substituted acids according to the invention are acrylic acid, methacrylic acid, crotonic acid, alpha-ethylacrylic acid, alpha-isopropylacrylic acid, tiglic acid, senecioic acid, hydrosorbic acid, alpha-butylcrotonic acid and like aliphatic hydrocarbon monocarboxylic acids, or aliphatic polycarboxylic acids such, for instance, as maleic, fumaric, aconic, itaconic, isopropylidine malonic, fumaramic, mesaconic, glutoconic, alpha-hydromuconic, 2-octenedioic and 5-octene-3,3,6-tricarboxylic acids. Alicyclic or aromatic alpha,beta-ethylenic carboxylic acids can likewise be used, suitable examples being 1-cyclohexenecarboxylic acid, 1-cyclohexaneacrylic acid, cinnamic acid, 1-naphthaleneacrylic acid, 3,4,5,6-tetrahydrophthalic acid and the like. Esters of these acids, particularly those of saturated aliphatic alcohols of 1 to 5 carbon atoms such as methyl, ethyl, isopropyl, the butyl and amyl alcohols, can be used instead of the free acid. Similarly one can employ the corresponding amides instead of the acids, that is, the foregoing acids wherein an —OH of a carboxyl group has been replaced by an

group in which one or both R's represent hydrogen or a hydrocarbon group, preferably a lower alkyl group. Examples of such amides are acrylamide, 2-hexenamide, cinnamide, diacrylamide, acrylanilide, maleamic acid, maleamide, etc. Carboxylic acids, esters and amides containing a plurality of ethylenic groups in the molecule will react similarly to the previously discussed alpha,beta-ethylenic aldehydes and ketones in that the addition of halogen and of the ether group will take place preferentially at the carbon atoms in alpha and beta positions respectively to the carbonyl carbon.

In general alpha,beta-ethylenic carbonyl compounds having 4 to about 30 carbon atoms per molecule are suitable starting materials for the reaction. Especially good results are obtained with alpha,beta-ethylenic aldehydes, ketones, carboxylic acids and their esters and amides of 4 to 12 carbon atoms. The process is of particular value in the production of alpha-halo-beta-ether-substituted carbonyl compounds from alpha,beta-monoethylenic-monocarbonylic hydrocarbons, especially aliphatic hydrocarbons of 4 to 10 carbon atoms per molecule.

A wide variety of alcohols can be used for reaction with the alpha,beta-ethylenic carbonyl or nitrile compound or mixture of such compounds which is chosen. Non-ethylenic mono- or poly-hydric alcohols are particularly suitable, preference being given to those which are liquid at the reaction temperature employed. Methanol, ethanol, normal orisopropanol, normal, secondary, tertiary or isobutanol, the amyl alcohols, decyl alcohol, lauryl alcohol, cetyl alcohol and the like are useful saturated aliphatic monohydric alcohols which can be employed. Cyclic alcohols such as cyclohexanol, benzyl alcohol, etc., are also reactive in the process. Among the polyhydric alcohols which can also be used are, for example, ethylene glycol, propylene glycol, butylene glycol, trimethylene glycol, 2-methyl-2,4-pentanediol, glycerol, 1,2,6-hexanetriol, pentaerythritol, sorbitol, and the like. When using polyols there may be some linking together of carbonyl molecules as a result of reaction with the same molecule of polyol. The extent of this reaction can be increased or minimized as desired by control of the proportions and concentrations of the reactants. In order to avoid such reactions it is advantageous to use monohydric alcohols for the reaction. As a rule, alcohols having 1 to 20 carbon atoms are useful, those with 1 to about 6 carbon atoms per molecule being usually preferable.

The following examples illustrate in more detail suitable methods of applying the invention:

Example I.—Beta-t-butoxy-alpha,alpha-dichloropropionaldehyde

In a 4-liter three-neck flask equipped with a stirrer and reflux condenser fitted with a calcium chloride tube was placed 27 ml. (0.4 mole) of acrolein, 216 g. of anhydrous cupric chloride, and 2.5 liter of t-butyl alcohol. The mixture was stirred and refluxed for about ten hours. During this time, the color of the mixture gradually changed from brown to yellow to greenish white. The flask contents were allowed to cool and the cuprous chloride was filtered off yielding 1.45 moles (90%). The resulting green solution was concentrated in vacuum to a volume of ca 250 ml. Approximately 50 ml. of ether was added, and the whole was filtered into a separatory funnel containing 1 liter of water. The separated upper yellow-orange phase was washed again with water and dried over calcium chloride. The dried ether solution was concentrated and distilled in vacuo.

| Fraction | Boiling Point | Weight |
|---|---|---|
| 1 | 30°/5 mm | Largely tBuOH. |
| 2 | 30°/4–37°/2 | 1.80 g. |
| 3 | 40°/2–49°/5 mm | 13.3. |
| 4 | Cool off—48°/3 mm | 12.5. |
| Residue | | 6.8. |

Fraction 3 is pure beta-t-butoxy-alpha,alpha-dichloropropionaldehyde, boiling point 40–41°/2 mm.

Beta-t-butoxy-alpha,alpha-dichloropropionaldehyde rapidly forms a white crystalline hydrate upon exposure to the atmosphere or admixture with water. The substance can be reformed by dissolving in warm Skellysolve B.

Melting point, 66.5–67° C.

Calculated for $C_7H_{14}O_3Cl_2$: 38.8% C, 6.50% H, 32.6% Cl. Found: 38.9% C, 6.5% H, 32.3% Cl.

In another experiment in which the mole proportion of cupric chloride to acrolein present in the reaction mixture was only 2.5:1, there was obtained in addition to higher boiling products fractions boiling:

| Fraction | Boiling Range, °C. at 1 mm. | Weight, grams | Refractive Index $N_D^{22}$ |
|---|---|---|---|
| 1 | 34–40 | 2.31 | 1.4398 |
| 2 | 37 | 7.41 | 1.4418 |
| 3 | 37–51 | 1.02 | 1.4682 |

These fractions were combined and redistilled to obtain a fraction boiling 53° C. at 3 mm., $N_D^{22}$ 1.4392, whose infrared spectrum had the following characteristics:

t-butoxy 878, 1110, 1190, 1320 and 1395 cms.$^{-1}$.

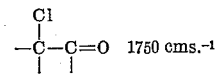

$$-\underset{|}{\overset{Cl}{C}}-\underset{|}{C}=O \quad 1750 \text{ cms.}^{-1}$$

Elemental analyses indicate a mixture of approximately 20% alpha-chloro-beta-tert.butoxypropionaldehyde with 80% of alpha,alpha-dichloro-beta-tert.butoxypropionaldehyde:

| | For t-Bu—O—CH$_2$—$\underset{\underset{Cl}{|}}{\overset{H}{\overset{|}{C}}}$—CHO | Found | For t-Bu—O—CH$_2$—CCl$_2$—CHO |
|---|---|---|---|
| Percent C | 51.05 | 43.8 | 42.3 |
| Percent H | 7.96 | 6.5 | 6.06 |
| Percent Cl | 21.60 | 32.3 | 35.5 |

Example II.—Beta-t-butoxy-alpha-chloro-isobutyraldehyde

The reaction was carried out in the same manner as that described in Example I for beta-t-butoxy-alpha,alpha-dichloropropionaldehyde. The following quantities were employed: 28.3 g. (0.40 mole) of methacrolein, 109 g. of anhydrous cupric chloride (0.80 mole) and 2 liter of t-butyl alcohol. At the end of the reaction, 0.17 equivalents of acid were titrated. The yield of cuprous chloride was 0.68 mole (85%). Work-up was as described for beta - t - butoxy - alpha,alpha - dichloropropionaldehyde. There were obtained the following fractions:

| Fraction | Boiling Point | Weight, grams |
|---|---|---|
| 1 | To 42° C./5 mm | 2.90 |
| 2 | 43° C./6–47°/5 | 20.3 |
| 3 | 38–31°/2 | 3.17 |
| Residue | Crystallized | 10.8 |

The infrared spectrum fraction 2 was similar to that of beta - t - butoxy-alpha,alpha-dichloropropionaldehyde; C=O at 1745 cms.$^{-1}$. A Tollen's test was positive, and the substance showed no precipitate upon boiling for one minute with aqueous-ethanolic silver nitrate. It reacted rapidly with base to liberate chloride ion.

Calculated for $C_8H_{15}O_2Cl$: 53.8% C, 8.45% H, 19.7% Cl; mol wt. 178. Found: 53.0, 53.1% C, 8.6, 8.4% H, 19.5% Cl; mol wt. (cryoscopic) 198 (the mol wt. of the hydrate would be 196.5).

The residue was recrystallized twice from carbon tetrachloride to yield small soft crystals, melting point 120.5–122° C.

Calculated for $C_{12}H_{22}O_4Cl_2$: 47.8% C, 7.35% H, 23.5% Cl; mol wt. 301. Found: 47.7% C, 7.2% H, 24.0% Cl; mol wt. (ebull.) 297.

The infrared spectrum showed:

O—H at 3620 cms.$^{-1}$, acetal 1075, 1110 cms.$^{-1}$, and TBuO 1200, 880–890 cms.$^{-1}$.

The indicated yields are 32% of beta-t-butoxy-alpha-chloroisobutyraldehyde and 20% of its crystalline solid hemi-acetal

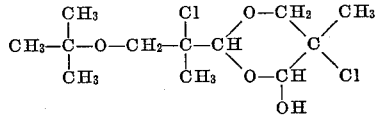

This hemi-acetal apparently results from hydrolysis of an intermediate of the formula

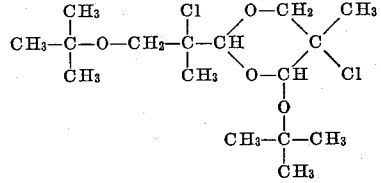

*Example III.* — *Alpha - bromo-beta-methoxypropionaldehyde and alpha,alpha - dibromo-beta-methoxypropionaldehyde*

A mixture of 6.7 moles (9.10 moles) acrolein, 89.5 g. (0.40 mole) of cupric bromide and 500 ml. of methanol was refluxed for two hours. Two days later the mixture was worked up as described in Example I. There was obtained 0.12 mole of cuprous bromide and the following fractions:

| Fraction | Boiling Point | Weight, grams | $n_D^{13.8}$ |
|---|---|---|---|
| 1 | 74°/3.5 mm | 2.42 | 1.4568 |
| 2 | 68–70°/2 | 6.23 | 1.4578 |

The infrared spectra of these cuts were identical, C—Br at 686 cms.$^{-1}$, acetal and CH$_3$—O, 1070, 1085, 1130, 1185 cms.$^{-1}$.

Calculated for C$_6$H$_{13}$O$_3$Br: 33.8% C, 6.1% H, 37.4% Br; mol wt. 213. Found: 33.5% C, 6.1% H, 37.8% Br; mol wt. (cryoscopic) 211.

The yield of 2-bromo-1,3,3-trimethoxy propane was 48% of theory. This acetal boils at 60° C./2 mm. and 48° C./0.5 mm. It was sluggish in reaction with silver nitrate in ethanol giving only a slight turbidity in one minute at boiling temperature. The free aldehyde form of the product has the formula

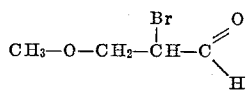

*Example IV.*—*Alpha-bromo-beta-ethoxypropionaldehyde and alpha, alpha-dibromo-beta-ethoxypropionaldehyde.*

Using the method of Example III acrolein was reacted with ethanol and cupric bromide. Fractionation of the product provided a clear water white oil boiling 104–113° C. at 14 mm. It was identified by infrared spectrum as 2-bromo-1,3,3-triethoxy propane, yield 67% of theory. A middle cut had a boiling point of 112.8° C. at 14 mm., $n_D^{20}$ 1.4548. The corresponding substituted aldehydes from this product has the structure

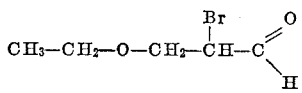

The monobromo acetal was converted by refluxing overnight with ethanolic KOH under nitrogen to beta-ethoxyacrolein diethyl acetal, boiling point 94–97°/20 mm. $n_D^{20}$ 1.4237. This acetal was converted to pyrazole-n-carboxamide, which after subliming at atmospheric pressure had a melting point of 140.5.

Calculated for C$_4$H$_5$N$_3$O: 43.3% C, 4.5% H, 37.9% N. Found: 43.1% C, 4.7% H, 38.2% N.

A 2,4-dinitro phenyl pyrazole obtained in the conventional manner from the beta-ethoxyacrolein acetal had a melting point and a mixed melting point 102°, solidified 104°, and remelt 108° C.

*Example V.*—*Alpha, alpha-dibromo-beta-t-butoxy propionaldehyde*

Substituting an equivalent amount of cupric bromide for the cupric chloride of Example I results in the production of alpha,alpha-dibromo-beta-t-butoxypropionaldehyde recoverable from the reaction mixture in the same way.

*Example VI.*—*Beta-isopropoxy-alpha,alpha-dichlorocinnamaldehyde*

Using the method of Example I for reaction of cinnamaldehyde with isopropyl alcohol and cupric chloride and working up the mixture in the same way affords beta-t-butoxy-alpha,alpha-dichlorocinnamaldehyde

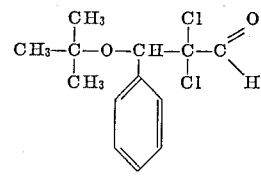

*Example VII.*—*2-t-butoxy-2-methyl-3,3-dichloropentanone-4*

When an equal mole proportion of mesityl oxide is substituted for the acrolein in the method of Example I, work up of the reacted mixture affords 2-t-butoxy-2-methyl-3,3-dichloropentanone-4 as one of the chief products.

*Example VIII.*—*Beta-t-butoxy-alpha,alpha-dichloropropionic acid*

Reaction of acrylic acid, tertiary butyl alcohol and cupric chloride using the method of Example I yields beta-t-butoxy-alpha,alpha-dichloropropionic acid which can be recovered by making the reaction mixture basic with aqueous sodium hydroxide solution and extracting twice with ether. The thus purified aqueous solution is acidified with 6 N sulfuric acid while cooling and saturated with ammonium sulfate. The saturated acidic solution is then extracted four times with ether and the ether extracts dried over sodium sulfate and concentrated on the steam bath. The crystallized residue is recrystallized from cyclohexane.

The same product is obtained by oxidizing the beta-t - butoxy - alpha,alpha - dichloropropionaldehyde from Example I using 2.5 grams of potassium permanganate in 60 ml. water for reflux with 2.0 grams of the aldehyde for 30 minutes with stirring. The product has a melting point of 81°–82° C. and analyzed as follows:

|  | Found | Calculated for C$_7$H$_{12}$O$_3$Cl$_2$ |
|---|---|---|
| Percent Carbon | 39.0 | 39.15 |
| Percent Hydrogen | 5.6 | 5.57 |
| Percent Chlorine | 31.7 | 32.9 |
| Equivalent weight | 218 | 215 |

Esters of the beta-t-butoxy-alpha,alpha-dichloropropionic acid can be made by esterifying the acid obtained as above or by substituting an acrylate, for example, tertiary butyl acrylate, for the acrylic acid in the reaction with tertiary butyl alcohol and cupric chloride and taking care to operate under conditions at which hydrolysis of the ester is avoided, advantageously by neutralizing the hydrochloric acid produced as fast as it is formed.

Another way of making esters of beta-ether-alpha-halocarboxylic acids according to the process of the invention is by substituting an alpha-beta-ethylenic nitrile for the alpha,beta-ethylenic carbonyl compounds in the foregoing reactions. In this modification of the invention, an alpha-halo-beta-ether-substituted nitrile is obtained as initial product but is converted to the ester when the aqueous acid reaction mixture containing excess alcohol is heated, preferably under reflux. The reactions involved can be represented by the equations:

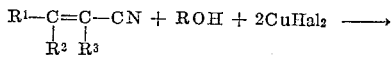

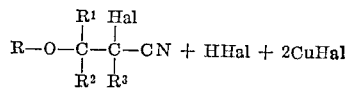

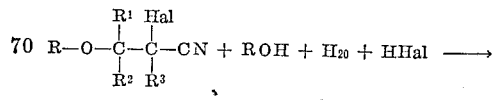

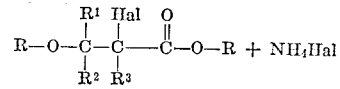

In these equations the R's all have the previously indicated significance. When R³ represents hydrogen, the corresponding alpha,alpha-dihalo nitriles and esters can be obtained by using four moles of cupric halide per mole of starting nitrile:

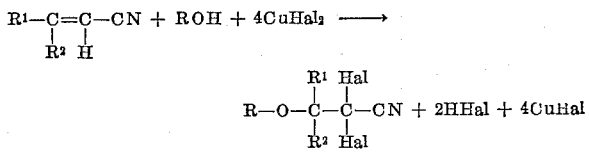

The beta-ether-alpha,alpha-dihalonitriles can be hydrolyzed in the same way as the mono-alpha-halonitrile ethers to obtain esters. In both cases the hydrolysis can be carried out without alcohol to make the corresponding ether-substituted, alpha-halo-carboxylic acids.

This modification of the invention is illustrated by the following example.

*Example IX.*—Beta - ethoxy - alpha,alpha - dibromopropionitrile and ethyl beta-ethoxy-alpha,alpha-dibromopropionate Acrylonitrile was reacted with ethanol and a four mole proportion of cupric bromide. The reaction mixture was cooled, the precipitated cuprous bromide was filtered off and the filtrate, diluted with water, was hydrolyzed under reflux. From the hydrolyzed solution there was obtained ethyl beta-ethoxy-alpha,alpha-dibromopropionate, boiling 49-53° C. at 1 mm. pressure and analyzing 27.1% carbon, 4.1% hydrogen, and 53.8% bromide. Infrared spectrum showed carbonyl C=O at 1745 cms.⁻¹.

Other alpha,beta-ethylenic nitriles which can be reacted in the same way include methacrylonitrile, crotononitrile, 2-octenenitrile, 1-cyanocyclohexene, maleonitrile, cinnamonitrile, and the like.

The alpha-halo-beta-ether nitriles which are formed in this modification can be recovered as final products of the process instead of being hydrolyzed in the reaction mixture. Distillation of the neutralized, preferably substantially anhydrous, reaction product is one method of recovering these substituted nitriles which are useful new compounds.

As previously indicated, the new products of the invention, especially the alpha-alpha-dihalo-beta-ether-substituted aldehydes, have particularly advantageous properties due to their unique structure. The alpha-alpha-dichloro-beta-alkoxyaldehydes and corresponding dibromoaldehydes having 4 to 15 carbon atoms per molecule and 1 to 10 carbon atoms in the alkoxy group are effective fungicides. For example, the alpha,alpha-dichloro-beta-t-butoxypropionaldehyde of Example I successfully controlled 4 organisms, namely, *Verticillium alboastrum, Penicillium italicum, Chaetomium globosom* and *Sclerotium rolfsii,* in vitro at 10 p.p.m. and in soil at 200 p.p.m.

These substituted carbonyl compounds can be reacted with trialkyl phosphites to produce propenyl phosphate esters substituted by an ether group in the 3-position of the propenyl radical. This reaction takes place according to the equation:

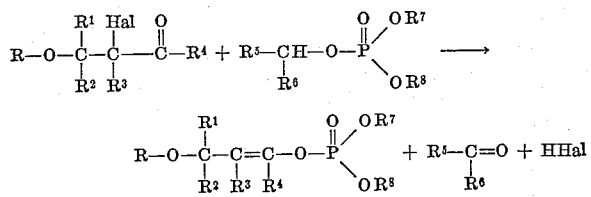

Here the symbols R, R¹, R², R³, R⁴ and Hal have the same significance as in the previously given equations. R⁵ and R⁶ represent hydrogen or alkyl groups and R⁷ and R⁸ represent alkyl groups, preferably lower alkyl groups which is also preferably the case when R⁵ and/or R⁶ represent alkyl groups. The reaction is advantageously carried out under the conditions described in U.S. Patent 2,956,073 for the reaction of similar phosphate esters with other types of alpha-halo-carbonyl compounds.

When R³ is halogen, preferably chlorine or bromine, the ether-substituted propenyl phosphates of the above type are especially advantageous agricultural chemicals because of their effectiveness in the control of noxious organisms of different kinds. This is shown by the following typical results of tests with 3-t-butoxy-2-chloropropenyl dimethyl phosphate obtained by reacting the product of Example I with trimethyl phosphite.

*Nematocide activity.*—100% control at 200 p.p.m. in water screen test

*Insecticidal activity.*—Concentration giving 50% control:

| | |
|---|---|
| House fly | 0.006%. |
| Pea aphid | 0.0097%. |
| Rice weevil | 0.0275%. |
| Corn earworm | 0.0358%. |
| Spider mite | 0.12%. |
| German roach | 0.45 ml. of 1% solution. |
| Milkweed bug | 0.53 ml. of 0.1% solution. |
| Albimanus | 0.4 p.p.m. |

The compounds of the invention have other advantageous applications. Those which are normally liquid, such, for instance, as 2-methoxy-2-methyl-2,2-dichloropentanone-4 and tertiary butyl beta-tert-butoxy-alpha,alpha-dichloropropionate, are useful solvents and diluents which can be employed in formulating lacquers and like coating compositions.

While the reaction of alpha,beta-ethylenic hydrocarbon aldehydes, ketones, carboxylic acids, esters, amides and nitriles to produce carbonyl and/or nitrile compounds having alpha-halogen atoms and beta-ether groups as the only substituents has been emphasized in the foregoing because of the special advantages of these starting materials and the particularly desirable properties of the products, the invention can be carried out successfully in the same way with carbonyl or nitrile compounds which contain substituents on carbon atoms other than those to which the alpha,beta-ethylenic double bond is attached. These double-bonded carbon atoms should be directly linked only to carbon and/or hydrogen or halogen atoms. When using such substituted starting ethylenic compounds it is preferable to employ those with substituents which are non-reactive under the reaction conditions. These include halogen, hydroxyl, ether, ester and like groups which do not interefere with the reaction, as in alpha-chloroacrolein and the like. It is feasible to also employ starting alpha,beta-ethylenic carbonyl compounds which contain substituents which undergo reaction in the process without interfering with the desired formation of an alpha-halo-beta-ether-substituted carbonylic product. In this modification of the new process care must, of course, be taken to provide additional cupric halide and/or alcohol to compensate for that, if any, which is consumed by reaction with the reactive substituents on the alpha,beta-ethlenic carbonyl compound. Similarly substituted alcohols can likewise be employed for the reaction. Also thioalcohols, that is, mercaptans, can be used in the reaction in place of the alcohols shown and are intended to be included in the term alcohol as used generically in the appended claims. Suitable thioalcohols are, for example, methyl, ethyl, iso- and normal-propyl, iso- and tertiary-butyl, hexyl and like mercaptans of 1 to 20, preferably 1 to 6, carbon atoms per molecule. For example, substitution of ethyl mercaptan for the t-butyl alcohol in Example I affords beta-ethylmercapto-alpha,alpha-dichloropropionaldehyde.

It will thus be seen that the invention is capable of considerable variation, not only with respect to the methods which can be employed in carrying out the new reaction but also in regard to the novel compounds which can be produced and in their useful applications. The invention is therefore not to be limited to the examples of operating techniques and new compounds which have been described by way of illustration only, nor by any theory advanced to explain the improvements which are obtained.

I claim as my invention:

1. A process for the production of halo-ether-substituted carbonyl compound having halogen of the group consisting of chlorine and bromine in alpha position to carbonyl and said ether group in beta position to said carbonyl and adjacent to said alpha-position which comprises
   intimately contacting and reacting at a temperature of about 50° C. to about the boiling point of the mixture for about 0.5 to about 12 hours,
   (a) alpha,beta-ethylenic carbonyl compound of the group consisting of unsubstituted, aliphatic aldehydes, ketones and carboxylic acids having up to 30 carbon atoms per molecule,
   (b) with a saturated, unsubstituted aliphatic alcohol of 1 to 20 carbon atoms per molecule, and
   (c) with a cupric halide of the group consisting of cupric chloride and cupric bromide.

2. A process in accordance with claim 1 wherein an alpha,alpha-dichloro-beta-alkoxy carbonyl compound is produced by reacting under atmospheric pressure ethylenic carbonyl compound having a hydrogen atom linked to the alpha carbon atom with an aliphatic alcohol of 1 to 6 carbon atoms and four mole proportions of cupric chloride.

3. A process in accordance with claim 2 wherein acrolein and a saturated aliphatic monohydric alcohol of 1 to 5 carbon atoms are reacted.

4. A process for the production of halo-ether-substituted carbonyl compound having halogen of the group consisting of chlorine and bromine in alpha position to carbonyl and said ether group in beta position to said carbonyl and adjacent to said alpha-position which comprises
   intimately contacting and reacting at a temperature of about 50° C. to about the boiling point of the mixture under atmospheric pressure for about 0.5 to about 12 hours,
   (a) alpha,beta-ethylenic carbonyl compound of the group consisting of unsubstituted, alpihatic aldehydes, ketones and carboxylic acids having up to 30 carbon atoms per molecule
   (b) with a saturated, unsubstituted aliphatic tertiary alcohol of up to 20 carbon atoms per molecule, and
   (c) with a cupric halide of the group consisting of cupric chloride and cupric bromide.

5. A process for producing alpha-halo-beta-ether-substituted nitrile wherein said halogen is chosen from the group consisting of chlorine and bromine which comprises
   intimately contacting and reacting at a temperature of about 50° C. to about the boiling point of the mixture for about 0.5 to about 12 hours,
   (a) alpha,beta-ethylenic unsubstituted aliphatic nitrile having 3 to 9 carbon atoms per molecule,
   (b) with a saturated, unsubstituted aliphatic alcohol of 1 to 20 carbon atoms per molecule, and
   (c) with a cupric halide of the group consisting of cupric chloride and cupric bromide.

6. A process for producing alpha-halo-beta-ether-substituted aliphatic aldehyde having halogen of the group consisting of chlorine and bromine which comprises reacting together in the liquid phase at a temperature of about 50° C. to about the boiling point of the mixture for about 0.5 to about 12 hours,
   (a) an unsubstituted aliphatic alpha,beta-ethylenic aldehyde, having 3 to 20 carbon atoms per molecule,
   (b) with a saturated, unsubstituted aliphatic alcohol of 1 to 20 carbon atoms per molecule, and
   (c) with a cupric halide of the group consisting of cupric chloride and cupric bromide.

7. A process for producing alpha-halo-beta-ether-substituted acetal having halogen of the group consisting of chlorine and bromine which comprises
   reacting together in the liquid phase at a temperature of about 50° C. to about the boiling point of the mixture for about 0.5 to about 12 hours,
   (a) an unsubstituted, aliphatic alpha,beta-ethylenic aldehyde having 3 to 20 carbon atoms per molecule, with
   (b) at least three moles of saturated aliphatic unsubstituted monohydric alcohol of 1 to 20 carbon atoms per mole of said aldehyde, and
   (c) with a cupric halide of the group consisting of cupric chloride and cupric bromide.

8. A process for producing alpha-halo-beta-ether ketone wherein said halogen is chosen from the group consisting of chlorine and bromine which comprises,
   intimately contacting and reacting in liquid phase at a temperature of about 50° C. to about the boiling point of the mixture for about 0.5 to about 12 hours,
   (a) alpha,beta-ethylenic unsubstituted aliphatic ketone having 4 to 12 carbon atoms per molecule
   (b) with a saturated, unsubstituted aliphatic alcohol of 1 to 20 carbon atoms per molecule, and
   (c) with a cupric halide of the group consisting of cupric chloride and cupric bromide.

9. A process in accordance with claim 8 wherein mesityl oxide is reacted with cupric chloride and a saturated aliphatic monohydric unsubstituted alcohol.

10. A process for producing alpha-halo-beta-ether-substituted carboxylic acid wherein said halogen is chosen from the group consisting of chlorine and bromine which comprises
    intimately contacting and reacting at a temperature of about 50° C. to about the boiling point of the mixture for about 0.5 to about 12 hours,
    (a) alpha,beta-ethylenic unsubstituted aliphatic carboxylic acid having 4 to 12 carbon atoms per molecule
    (b) with a saturated, unsubstituted aliphatic alcohol of 1 to 20 carbon atoms per molecule, and
    (c) with a cupric halide of the group consisting of cupric chloride and cupric bromide.

11. A process in accordance with claim 10 wherein the ethylenic carboxylic acid is acrylic acid and the alcohol is a saturated aliphatic monohydric unsubstituted tertiary alcohol of 1 to 5 carbon atoms per molecule.

12. A process for producing alpha-halo-beta-ether-substituted carboxylic acid ester wherein said halogen is chosen from the group consisting of chlorine and bromine which comprises,
    intimately contacting and reacting at a temperature of about 50° C. to about the boiling point of the mixture for about 0.5 to about 12 hours,
    (a) alpha,beta-ethylenic unsubstituted aliphatic nitrile having 3 to 9 carbon atoms per molecule
    (b) with a saturated unsubstituted aliphatic alcohol of 1 to 20 carbon atoms per molecule, and
    (c) with a cupric halide of the group consisting of cupric chloride and cupric bromide,
    using at least two moles of said alcohol and at least two moles of said cupric halide per mole of said nitrile and heating the reacted mixture in the presence of water to form said alpha-halo-ether substituted ester wherein said halogen corresponds to that of said cupric halide and the ether and ester groups are derived from said alcohol.

References Cited by the Examiner
UNITED STATES PATENTS

| | | | |
|---|---|---|---|
| 2,276,666 | 11/1942 | Ostrowski et al. | 260—602 |
| 2,392,100 | 1/1946 | Price et al. | 260—651 |
| 2,988,537 | 6/1961 | Wiley | 260—484 |

FOREIGN PATENTS 517,009  9/1955  Canada.

LEON ZITVER, *Primary Examiner.*
DANIEL D. HORWITZ, *Examiner.*
J. J. SETELIK, B. HELFIN, *Assistant Examiners.*